United States Patent
Boe

(12) 
(10) Patent No.: US 6,262,864 B1
(45) Date of Patent: Jul. 17, 2001

(54) MECHANISM FOR CONTROLLING EJECTION OF DISKS FROM A DISK DRIVE

(75) Inventor: Craig L. Boe, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/132,349

(22) Filed: Aug. 12, 1998

(51) Int. Cl.[7] .................................................. G11B 17/04
(52) U.S. Cl. ...................... 360/99.06; 369/75.2; 369/77.2
(58) Field of Search .............................. 360/99.02, 99.06; 369/75.2, 77.1, 77.2, 204

(56) References Cited

U.S. PATENT DOCUMENTS

| | | | |
|---|---|---|---|
| 4,434,480 | * | 2/1984 | Fukumitsu ............................ 369/77.2 |
| 4,470,136 | * | 9/1984 | Takahashi et al. ................... 369/77.1 |
| 4,764,917 | * | 8/1988 | Sugihara et al. ..................... 369/77.1 |
| 5,142,523 | * | 8/1992 | Kamoshita ............................ 369/75.2 |
| 5,255,255 | * | 10/1993 | Kaneda et al. ....................... 369/77.1 |
| 5,260,925 | * | 11/1993 | Camps et al. ........................ 369/77.1 |
| 5,335,124 | * | 8/1994 | Yokota ................................. 360/99.06 |
| 5,872,756 | * | 2/1999 | Shime .................................. 369/77.1 |
| 5,912,870 | * | 6/1999 | Kanno et al. ........................ 369/77.2 |

* cited by examiner

*Primary Examiner*—William Klimowicz
(74) *Attorney, Agent, or Firm*—Knobbe, Martens, Olson & Bear, LLP

(57) ABSTRACT

A computer drive assembly for receiving portable disks containing computer data. The computer drive assembly has a housing defining a cavity, an ejection mechanism that engages with the disk and at least one roller member. The cavity is sized so as to receive a portable disk through an opening in the housing such that when the disk is positioned in a first position in the cavity, computer data stored in the disk can be accessed. When the disk is in the first position, the ejection mechanism urges the disk along a first path toward the opening so as to eject the disk from the cavity. At least one roller member is positioned along the first path so that the at least one roller member contacts the disk as it is being urged along the first path and retains the disk in the housing so that only a portion of the disk extends out of the opening in the housing. At least one roller member is adapted to permit a user to remove the disk from the housing by grasping the portion of the disk that extends out of the opening and pulling the disk from the housing.

28 Claims, 7 Drawing Sheets

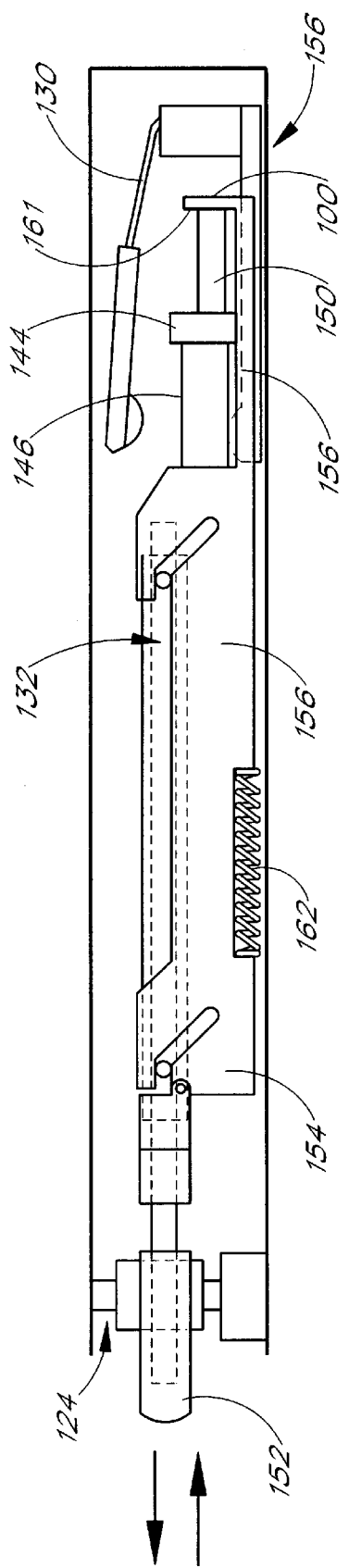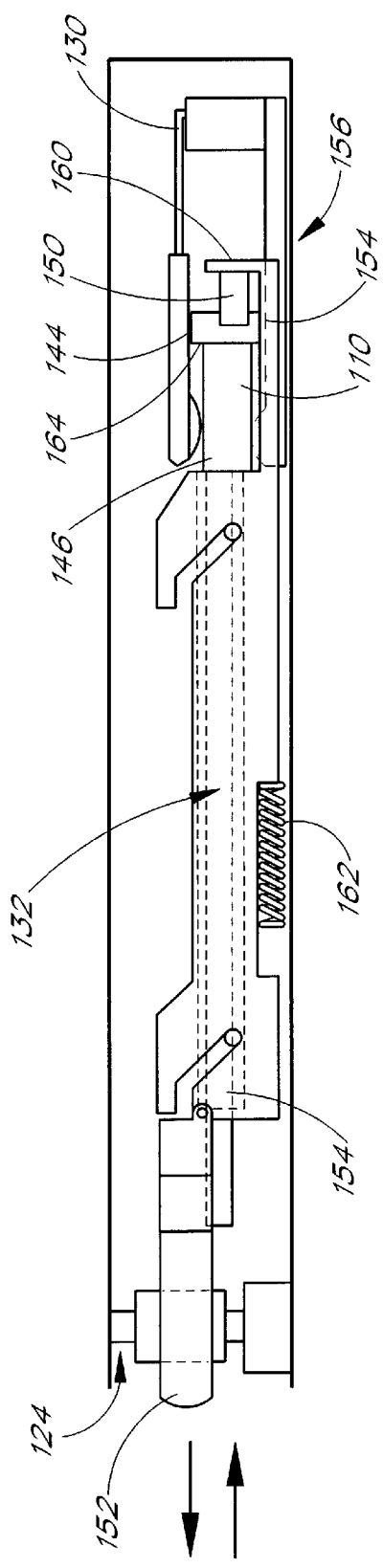

MECHANISM FOR CONTROLLING EJECTION OF DISKS FROM A DISK DRIVE

BACKGROUND OF THE INVENTION

1. Field of the Invention

The invention generally relates to computer diskdrives and, more particularly, concerns loading and unloading mechanisms for such disks.

2. Description of the Related Art

Computers which are used extensively in homes and business conventionally include a monitor, a keyboard and a chassis called either the system unit or central processing unit (CPU). The system unit is a cabinet that contains many subsystems, such as a microprocessor chip, memory chips and ports to which other peripherals can be connected. Besides providing a convenient place for these components, the system unit also contains data storage/retrieval devices which are often referred to as drives. Drives are used to both store data onto and to retrieve stored data from various types of data recording mediums. In general, drives are labeled with their associated recording medium such as hard-drive, CD-drive, tape-drive or diskdrive.

Most of today's computers, including desktop, laptop, notebook and portable computers, are equipped with at least one diskdrive capable of reading data from or writing data to computer disks. Due to the portability of the disks, diskdrives have become extremely important components of computers.

A typical diskdrive includes a carriage that receives the disk and is movable into a position where information can either be stored or retrieved from the disk via a magnetic read/write head. The diskdrive also includes an ejection mechanism that, when actuated by the user, results in the disk being ejected out of the diskdrive. Typically, the ejection mechanism is comprised of one or more spring loaded members that engage with the carriage and disk so that when the ejection mechanism is actuated by the user, the disk is moved outwardly so as to eject the disk out of the drive.

The ejection mechanism is generally actuated by the user depressing a button on the front surface of the computer which results in the spring loaded member being released so as to propel the disk out of the front of the drive. However, unless the manufacturing tolerances are very tightly controlled, ejection mechanisms can eject disks at a variety of distances out of the front of the diskdrive. For example, some drives cannot eject the disk far enough to allow the disk to be easily removed by hand. Other drives may eject the disks so forcefully that the disk can land on the floor, which can inconvenience the user and even damage the disk.

Moreover, as the diskdrive ejection mechanism is used, the spring that is actuating the ejection mechanism can weaken over time, thereby resulting in the diskdrive failing to adequately eject the disk from the drive. To address this problem, the spring mechanism is often made stronger than necessary to compensate for the spring fatiguing over time to ensure that the disks are adequately ejected. However, this can result in the disks being too forcefully ejected from the drive.

One approach to the problem of inconsistent ejection of the disks by the diskdrive ejection mechanism is to impose stringent manufacturing tolerances on the springs and other components used in the ejection mechanism to ensure that the disks are properly ejected. However, this approach still has the difficulty of components becoming fatigued through use affecting the subsequent operation of the mechanism. Moreover, strict tolerances on component parts increases the cost and completely of these component parts and thereby increases the overall cost and complexity of the drive.

Thus, in the computer industry, there is a need to develop new diskdrives which are capable of providing convenient removal of the computer disks. To this end, there is a need for a diskdrive that controls the degree of ejection of the disk from the diskdrive without requiring as precise of tolerances be used to manufacture the ejection mechanism.

SUMMARY OF THE INVENTION

The aforementioned needs are satisfied in one embodiment by a diskdrive assembly that comprises a chassis defining a receptacle having an opening at a first end, the receptacle adapted to receive a disk. The diskdrive further includes an ejection mechanism having a user member wherein the ejection mechanism ejects the disk from the receptacle out of the opening at the first end in response to the user manipulating the user member and an ejection control mechanism that engages with the disk after the user has manipulated the user member so as to partially retain the disk in the receptacle with a portion of the disk extending out of the receptacle, wherein the ejection control mechanism is adapted to allow the user to fully extract the partially ejected disk form the opening of the receptacle.

In another embodiment the invention comprises an ejection control mechanism for a computer diskdrive that prevents the computer disk from being fully ejected from the diskdrive upon user actuation of an ejection mechanism of the diskdrive, the ejection control mechanism comprising at least one roller mounted about a shaft at a position adjacent an opening to the diskdrive wherein the roller is adapted to rotate a fixed rotational distance upon ejection of the disk and wherein the disk and the at least one roller member engage with each other during ejection of the disk so that the rotational movement of the at least one roller member urges the disk partially out of the diskdrive into a partially ejected position and wherein the frictional engagement between the disk and the roller member after the roller member has rotated the fixed rotational distance at least in part retains the disk in the diskdrive in the partially ejected position.

The ejection control mechanism thereby prevents the disks from being fully ejected from the diskdrive while allowing the diskdrive ejection mechanism to use component parts having a range of tolerances. These and other objects and advantages will become more fully apparent from the following description taken in conjunction with the accompanying drawings.

BRIEF DESCRIPTION OF THE DRAWINGS

FIG. 3A is a side plan view of the diskdrive assembly of FIG. 2A, showing the configuration of the ejection mechanism without a disk being positioned in the diskdrive;

FIG. 3B is a side plan view of the diskdrive assembly of FIG. 2A, showing the configuration of the ejection mechanism with a disk being positioned in the diskdrive;

DETAILED DESCRIPTION OF THE INVENTION

Figure 1:
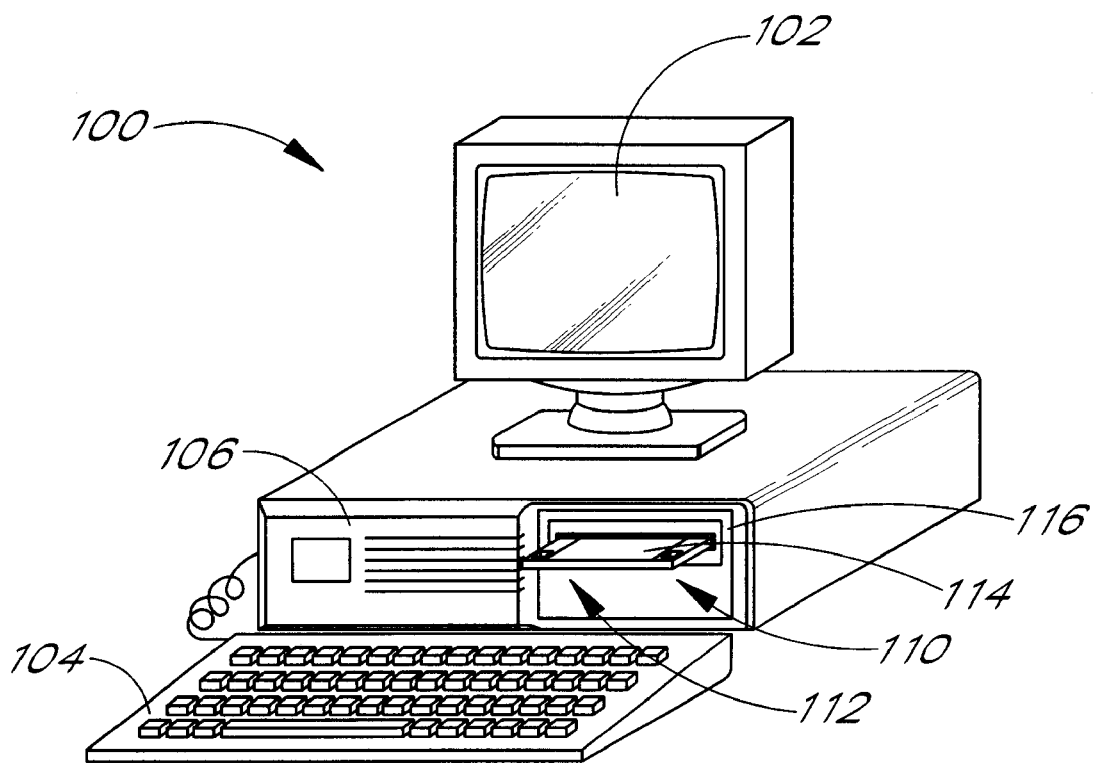
FIG. 1 is a perspective view of an exemplary computer work station.

Reference will now be made to the drawings wherein like numerals refer to like parts throughout. FIG. 1 illustrates a computer 100 incorporating one embodiment of a diskdrive ejection control mechanism. The computer 100 includes a display 102, a user input device 104, which in this embodiment is comprised of a keyboard, and a system unit 106 which incorporates a diskdrive 110. It will be appreciated from the following description that the diskdrive ejection control mechanism described herein can be used in conjunction with a diskdrive that is adapted to be used with any of a number of different types of computers including desk-type computers, laptop computers, notebook computers, word processors or any type of computing device which incorporates a diskdrive. As shown in FIG. 1, a disk 112 is extending out of the diskdrive 110 so that a portion of the disk 112 extends beyond a front face 114 of the system unit 106 to thereby allow a user to grasp the exposed portion 114 of the disk 112 and pull the disk 112 away from the front face 116 of the system unit 106.

FIGS. 2A, 2B, 3A and 3B illustrate an exemplary diskdrive 110 which incorporates a diskdrive ejection control mechanism 120. It will be appreciated from the following description that the ejection control mechanism 120 can be used in conjunction with any of a number of diskdrives without departing from the spirit of the invention. However, to facilitate an understanding of the operation of the ejection control mechanism 120, the diskdrive 110 illustrated in FIGS. 2A, 2B, 3A and 3B will be described in some detail.

Figure 2A:
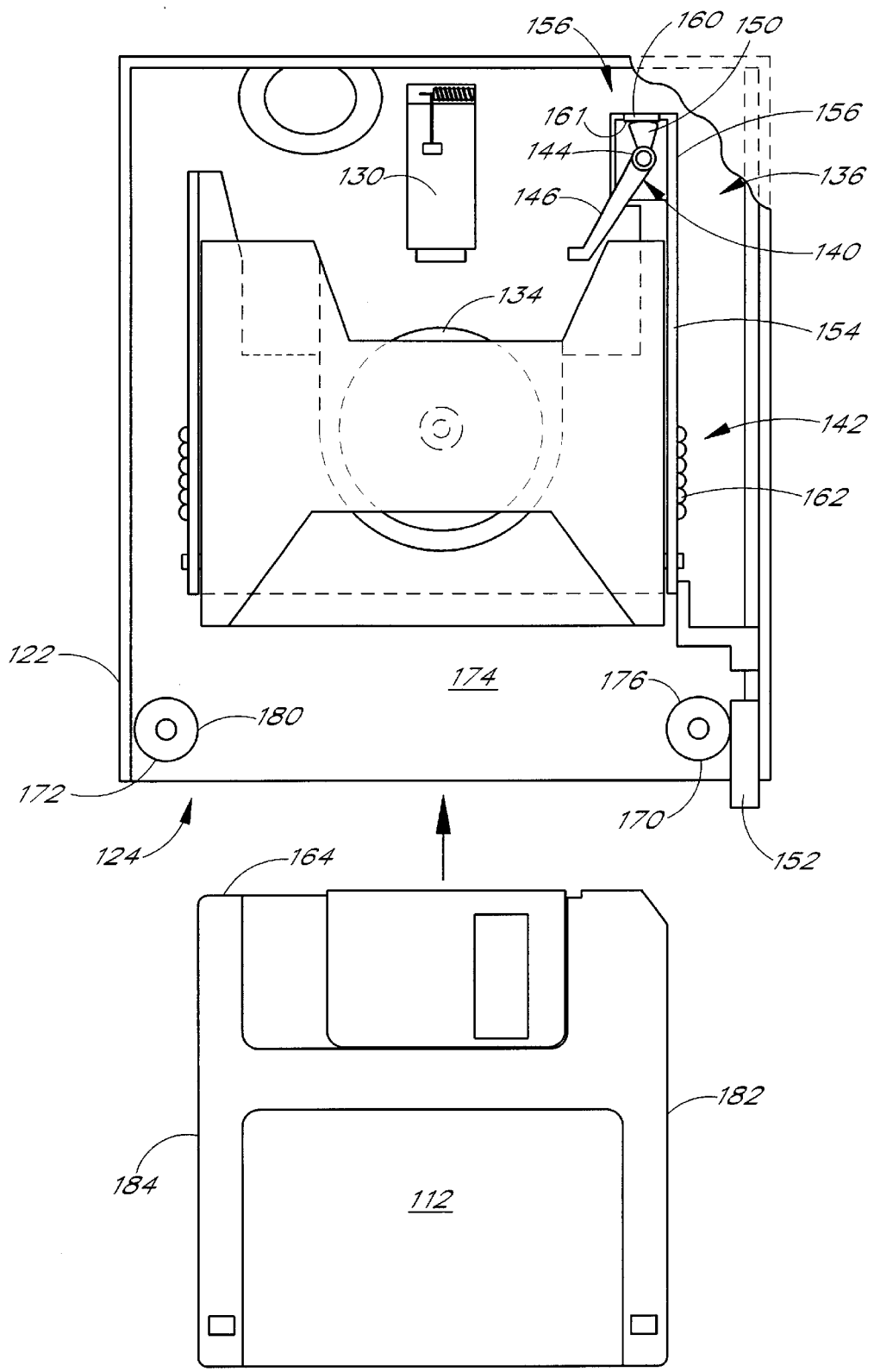
FIG. 2A is a top plan view of one embodiment of a diskdrive assembly showing the configuration of an ejection mechanism without a disk being positioned in the diskdrive.
Figure 2B:
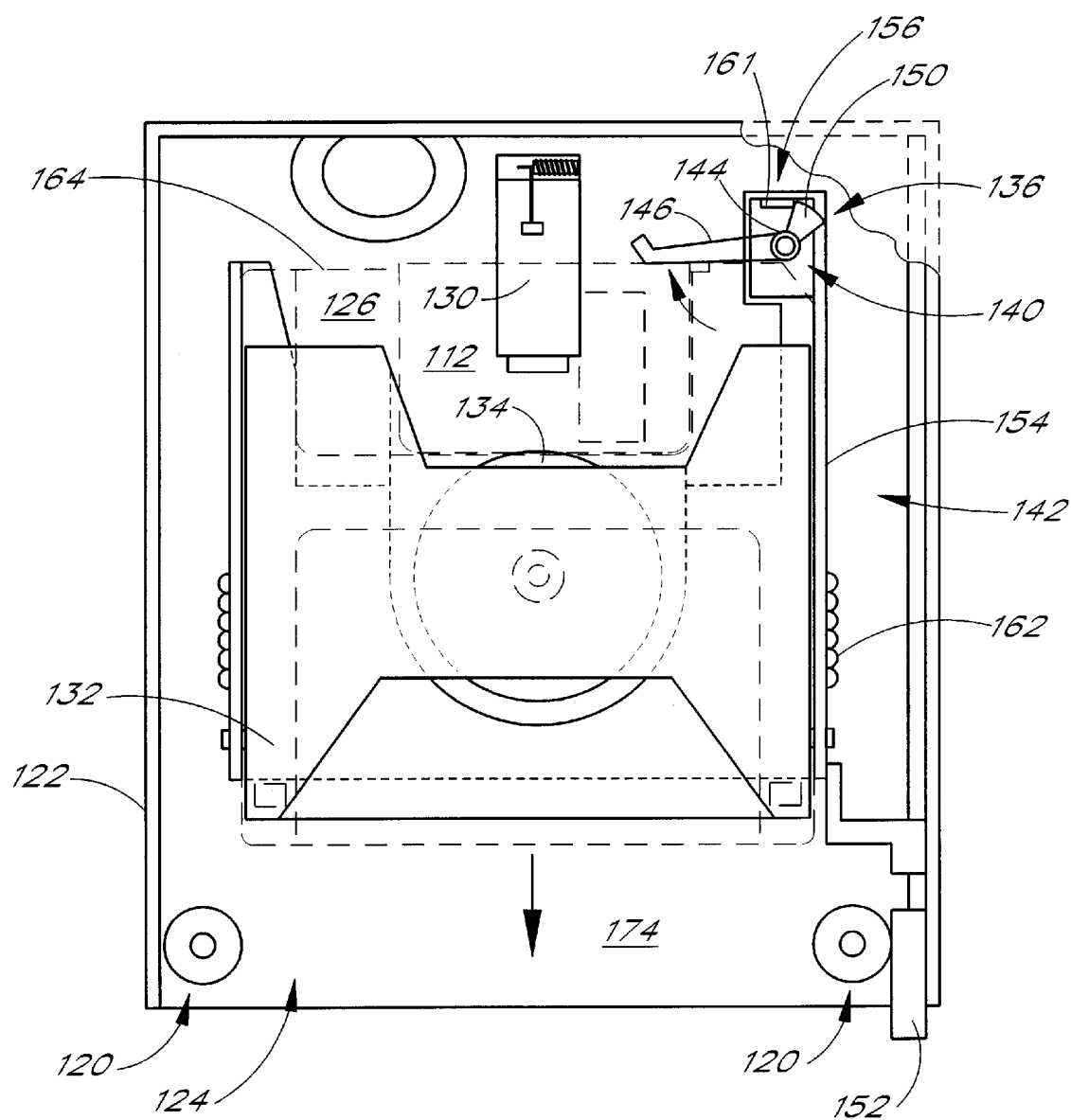
FIG. 2B is a top plan view of the diskdrive assembly of FIG. 2A, showing the configuration of the ejection mechanism with a disk being positioned in the diskdrive.

In particular, referring to FIG. 2A and 2B, the diskdrive 110 is generally mounted within a chassis 122 that has an opening 124 through which the disk 112 is to be inserted. The chassis 122 further defines a receptacle 126 that is to receive the disk 112 in its fully inserted position (see FIGS. 2B and 3B) so that a read/write head assembly 130 can read information from and write information to the disk positioned within the receptacle 126. Typically, the disk 112 is positioned on a carriage 132 so that a rotating member 134 can engage with the disk to thereby allow the disk to be spun so that the read/write head assembly 130 can transfer information to and from the disk 112. The exact operation of the transferring of data from the read/write head assembly 130 to the disk 112 can be performed in any of a number of manners that are well-known in the art. The diskdrive 110 also includes an ejection mechanism generally designated 136. The ejection mechanism 136 includes an ejection member 140 and a plunger mechanism 142.

The ejection member 140 is mounted so as to be rotatable about a post 144 that is mounted to the chassis 122 of the diskdrive 110. The ejection member 140 includes a contact arm 146 which generally extends into the area of the receptacle 126 that is adapted to receive the disk 110. As shown in FIGS. 2A and 2B, the contact arm 146 is initially positioned adjacent the carriage 132 and when the disk 112 is inserted into the carriage 132 and makes contact with the contact arm 146, the disk 112 causes the ejection member 140 to rotate about the post 144 in a clockwise direction. However, the ejection member 140 is biased in a well-known manner, such as by a spring that is mounted about the post 144, so that the ejection member 140 is biased to rotate in a counter-clockwise direction about the post 144.

The plunger mechanism 142 engages with the ejection mechanism 140 so that manipulation of the plunger mechanism 142 results in the ejection mechanism 140 ejecting a disk 112 positioned in the carriage 132. In this embodiment, the plunger mechanism 142 includes a plunger 152 that is mounted so as to extend outward of the front face 116 of the system unit 106. The plunger 152 is mechanically connected to a slider member 154 so that depression of the plunger 152 results in the slider member 154 moving away from the opening 124 at the front of the diskdrive 110.

A distal end 156 of the slider member 154 is adapted to engage with the ejection member 140 so that the spring biased ejection member 140 is actuated by the manipulation of the plunger 152. Specifically, as shown in FIGS. 3A and 3B, a retaining post 160 is formed on the distal end 156 of the slider member 142. The retaining post 160 is adapted to engage with the retaining arm 150 of the ejection member 140 in two positions of the slider member 154.

In particular, referring to FIG. 2A, the ejection member 140 is spring biased so as to be in the position shown in FIG. 2A when the disk 112 is not loaded in the diskdrive 110. In this position, the retaining arm 150 of the ejection member 140 contacts a front face 161 of the retaining post 160 of the slider member 154. As shown in FIG. 3A, a spring 162 biases the slider member 154 in the direction of the opening 124 of the diskdrive 110. However, the engagement between the retaining arm 150 of the ejection member 140 and the retaining post 160 of the slider member 154 prevents the slider member 154 from moving in the direction of the opening 124 of the diskdrive 110.

However, when the disk 112 is inserted into the opening 124 of the diskdrive 112 so as to be loaded into the carriage 132, a first surface 164 (FIG. 2B) of the disk 112 engages with the contact arm 146 of the ejection member 140 causing the ejection member 140 to rotate in a clockwise direction, as illustrated by the arrow in FIG. 2B, so that the retaining arm 150 is disengaged from the front face 161 of the retaining post 160. The spring 162 then urges the slider member 154 in the direction of the opening 124 of the diskdrive 110 so that the retaining arm 150 of the ejection member 140 is captured by the retaining post 160 so as to retain the ejection member 140 in the position shown in FIG. 2B and 3B and prevent rotation of the ejection member 140 in the counterclockwise direction.

The spring 162 that urges the slider member 154 in the direction of the opening 124 of the diskdrive 110 also results in the plunger 152 extending outward from the front face 116 of the system unit 106. Depression of the plunger 152 results in the slider member 154 being urged away from the opening 124 thereby removing the retaining post 160 of the slider member 154 from engagement with the side of the retaining arm 150 of the ejection member 140.

As discussed above, the ejection member 140 is spring biased so as to rotate in a counterclockwise direction. Removal of the retaining post 160 of the slider member 154 from contact with the side of the retaining arm 150 of the ejection member 140 results in the ejection member 140 rotating counterclockwise and thereby urging the disk 110 out of the carriage 132 so that the exposed portion 114 of the disk 112 extends beyond the front surface 116 of the system unit 106 in the manner shown in FIG. 1. The spring that biases the ejection member 140 so as to rotate in the counterclockwise direction is relatively strong so that an impulse is provided to the disk 112 from the contact arm 146 to the front edge 164 of the disk 112 to thereby urge the disk 112 out of the opening 124 of the diskdrive 110.

The foregoing discussion relating to the diskdrive 110 and, in particular, the ejection mechanism 136 and the plunger mechanism 142, is simply illustrative of an ejection mechanism of one commonly available diskdrive assembly 110. As discussed above, the diskdrive 110 of this embodiment includes an ejection control mechanism 120 which engages with the disk 112 following ejection from the carriage 132 by the ejection member 140 so that the disk 112 is not ejected completely out of the diskdrive and is retained in the diskdrive 110 with only the exposed portion 114 of the disk 112 extending beyond the front face 116 of the system unit 106.

Referring initially to FIGS. 2A and 2B, the ejection control mechanism 120 is comprised of a first ejection control roller 170 and a second ejection control roller 172. The first and second ejection control rollers 170, 172 are positioned in a space 174 that is interposed between the opening 124 in the diskdrive 110 and the carriage 132 of the diskdrive 110. The ejection control mechanism 120 will now be described in greater detail in reference to FIGS. 4A and 4B.

Figure 4A:
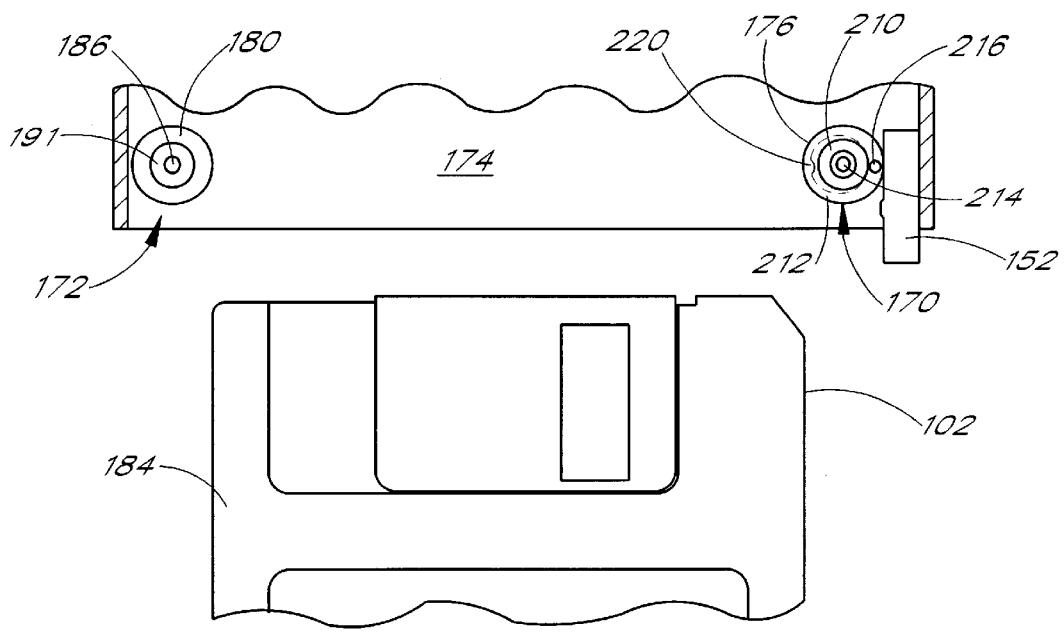
FIG. 4A is a top plan view of the ejection control mechanism of the diskdrive assembly.
Figure 4B:
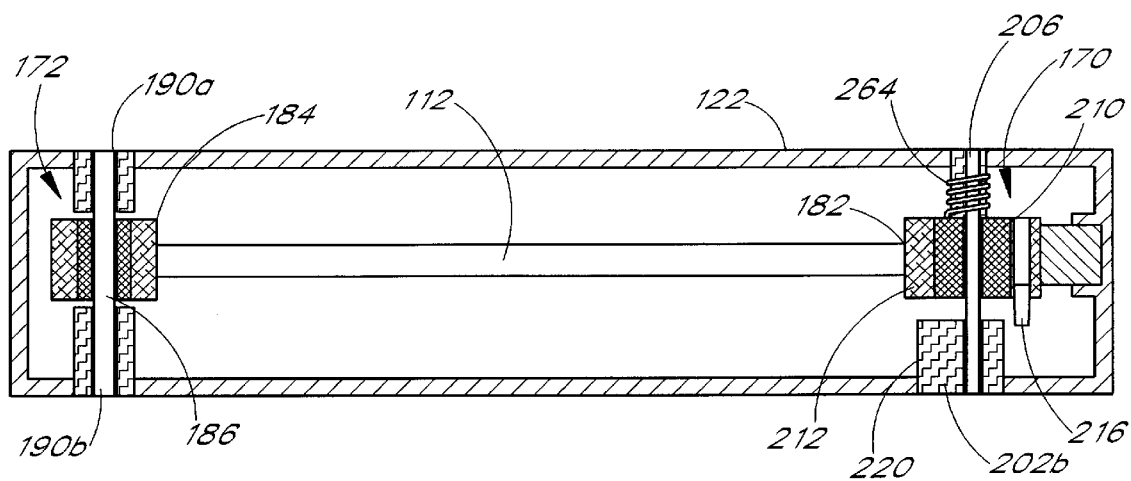
FIG. 4B is a front cross-sectional view of the ejection control mechanism of FIG. 4A taken along the line 4B—4B in FIG. 4A.

As shown in FIGS. 4A and 4B, the ejection control rollers 170, 172 are spaced so that an outer surface 176 of the first ejection control roller 170 and an outer surface 180 of the second ejection control roller 172 are spaced apart a distance that is substantially equal to the width of the disk 112 so that lateral surfaces 182 and 184 of the diskdrive frictionally engage with the outer surfaces 180 and 176 of the rollers 172 and 170, respectively, during both insertion and ejection of the disk 112 from the diskdrive 110.

As shown in FIGS. 4A and 4B, the roller 172 is mounted on a pin 186 that is captured within two recesses defined by recess housings 190a and 190b so that the pin 186 extends in a direction perpendicular to the plane of the diskdrive and is retained therein by a bushing 191. Generally, the roller 172 is made of some rigid material, such as nylon or plastic, and the shaft 186 is captured within the recesses 190a and 190b so as to be right-hand threaded.

The first ejection control roller 170 is also mounted about a shaft 200 which is captured within cavities defined by recess housings 202a and 202b so that the shaft 200 extends in a direction that is normal to the plane of the diskdrive 110. As illustrated in FIG. 4B, a spring 264 is mounted about the recess housing 202a and is anchored in the chassis 122 of the diskdrive 110 and in the first ejection control roller 170 so as to bias the roller 170 to rotate in a first rotational direction. In this embodiment, the spring is adapted to bias the first roller member 170 so that the first roller member is inclined to rotate about the shaft in a counterclockwise direction.

The first roller member 170 is comprised of a first radial member 210 which is preferably formed of a compressible material, such as rubber or the like, and a second radial member 212 which in this embodiment is made of a more rigid material, such as a plastic or polymer material, such as the material sold under the trademark name Delrin™. A threaded bushing 214 is coaxially disposed between the first radial member 210 and the housing for the recess 202a in the manner that is shown in FIG. 4A.

As shown in FIG. 4B, a retaining pin 216 is mounted in the second radial member 212 so as to extend outwardly from a bottom face of the first roller member 170. The pin 216 is adapted to engage with a recess 220 formed on the recess housing 202b when the roller member 170 is in a rotational position such that the pin 216 is aligned with the recess 220 in a manner that is shown in greater detail in FIG. 5B herein below.

The use of a compressible inner radial member 210 means that the exertion of a force against one side of the first control roller 170 means that the rigid outer radial member 212 of the first control roller 170 is laterally movable with respect to the axis defined by the shaft 200. As will be described in greater detail below, the retaining pin 216 can be dislodged from the recess 220 formed on the recess housing 202b as a result of a protrusion 230 formed on the plunger 152 contacting a first side 232 of the rigid outer radial member 212 of the first ejection control roller 170 and urging the rigid outer radial member 212 laterally towards the second control roller 172 as a result of compression of the inner radial member 210 about the shaft 200.

In particular, the operation of the ejection control mechanism 120 will now be described in reference to FIGS. 5A through 5D. In particular, the spring 264 biases the first roller 170 into the rotational position shown in FIG. 5A wherein the retaining pin 216 is positioned 180 degrees from the recess 220 when the disk 112 is not positioned in the diskdrive 110. However, when the disk 112 is inserted into the opening 124 of the diskdrive 110, so as to be positioned between the first roller 170 and the second roller 172, the edges of the disk 182 and 184 engage with the outer surface of the control rollers 170 and 172, respectively, so as to cause the rollers 170 and 172 to rotate.

Specifically, the engagement of the lateral edge 182 of the disk 112 with the outer surface 176 of the first ejection control roller 170 induces the roller 170 in this embodiment to rotate in a clockwise direction against the bias of the spring 264. The pin 216 and the recess housing 202b are respectively positioned so that the pin 216 travels about the outer perimeter of the recess housing 202b until it reaches the recess 220. The resiliency of the inner radial member 210 of the roller member allows the pin 216 to be captured within the recess 220 in the manner shown in FIG. 5B. Once the pin 216 is captured within the recess 220, the roller 170 is retained by the pin 216 in the recess 220 in the rotational position shown in FIG. 5B. However, it will be understood that the spring 264 (FIG. 4A) is biasing the roller member 170 so as to rotate in a counterclockwise direction upon the release of the pin 216 from the recess 220.

Figure 5A:
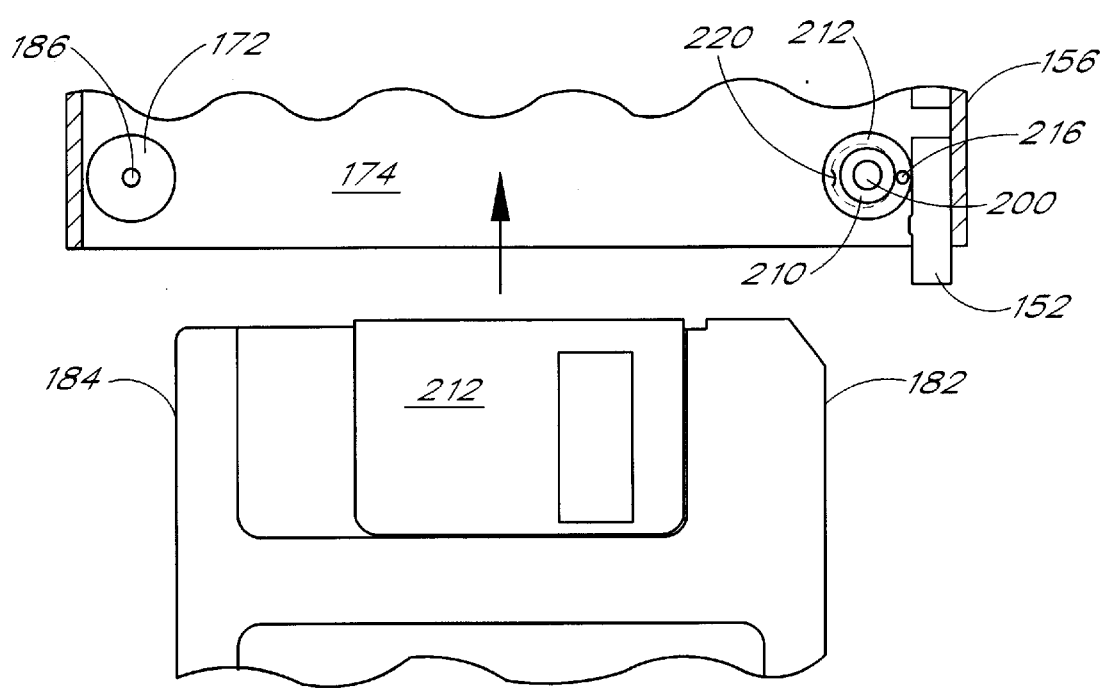
FIGS. 5A–5D are partial top plan views showing several stages in the operation of the ejection control mechanism.
Figure 5B:
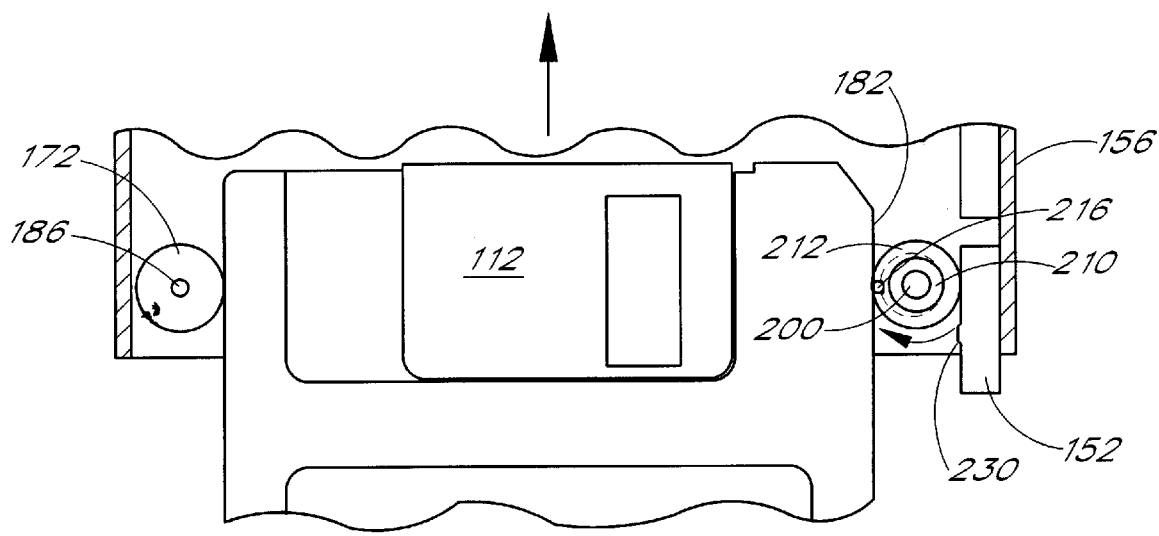
Figure 5C:
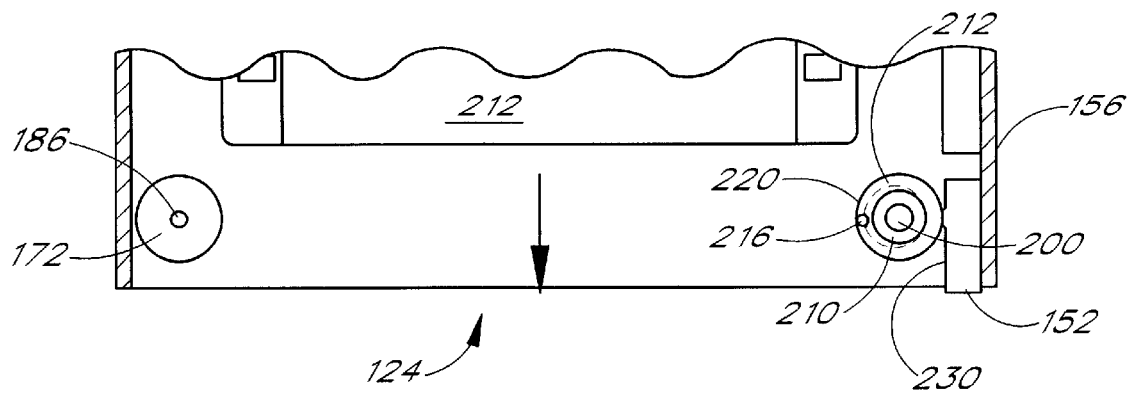

When the operator chooses to eject the disk 112 from the diskdrive 110, the operator will depress the plunger 152 inward into the diskdrive 110. This results in the retaining post 160 of the slider member 154 disengaging with the retaining arm 150 of the ejection member 140 so that the ejection member 140 rotates so that the disk 112 is urged in the direction of the opening 124 in the manner that was described above in conjunction with FIGS. 2A, 2B, 3A and 3B. Simultaneously, the protrusion 230 exerts a lateral force against the rigid outer radial member 212 of the first roller 170 thereby compressing the inner compressible radial member 210 about the shaft 200 in the manner shown in FIG. 5C. This results in the outer radial member 212 moving translationally with respect to the axis defined by the shaft 200 so that the pin 216 is disengaged from the recess 220. The spring 204 then induces the first roller member 170 to rotate counterclockwise back to the position that is shown in FIG. 5A.

Figure 5D:
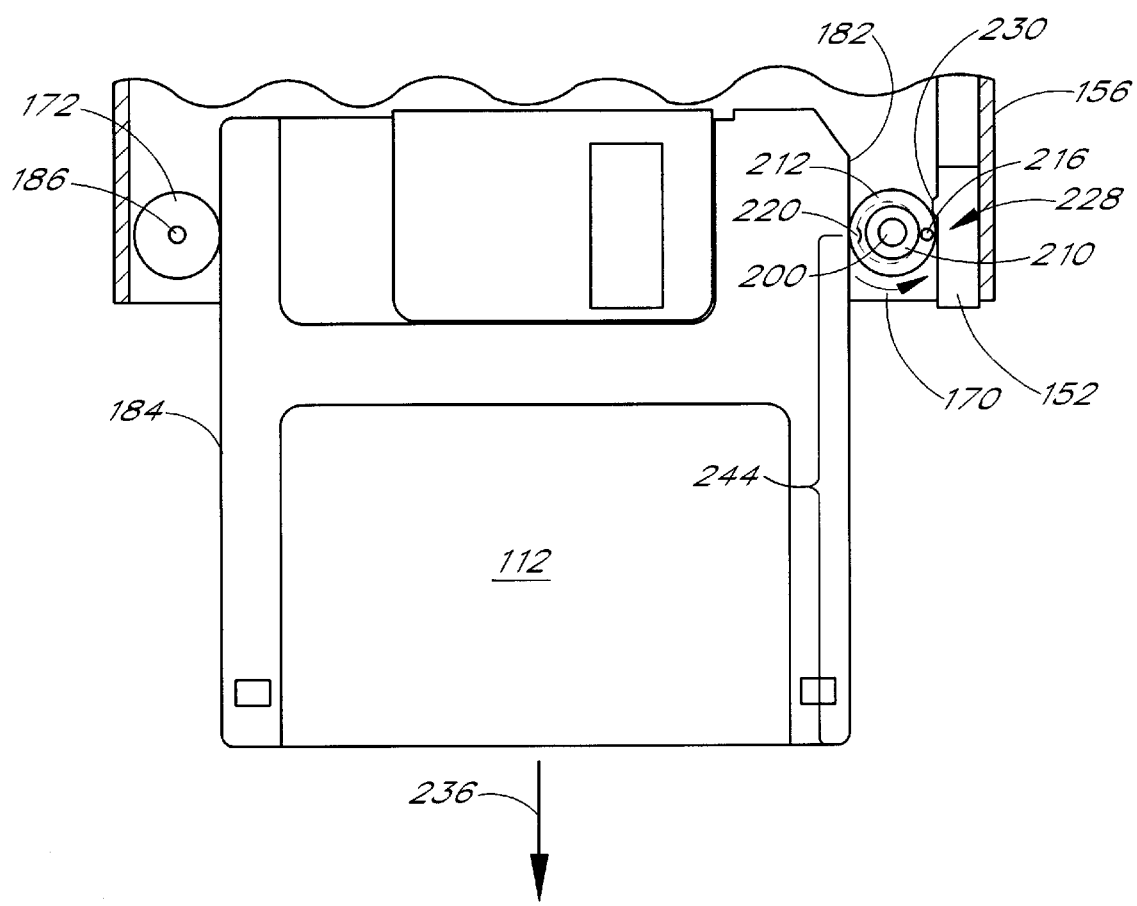

However, as shown in FIG. 5D, upon disengagement of the pin 216 from the recess 220, the disk 112 is already moving in the direction of the opening 124 of the diskdrive, i.e., in the direction of the arrow 238 in FIG. 5D, such that the lateral edge 182 of the disk comes in contact with the rotating first control roller 170. The rotation of the roller 170 180° exerts an outward force in the direction of the arrow 238 against the lateral edge 182 of the disk 112 further urging the disk 112 out of the diskdrive 110 until the first control roller 170 stops rotating. At that time, the frictional engagement of the lateral surfaces 182 and 184 of the disk 112 with the outer surfaces 176 and 180 of the rollers 170 and 172, respectively, halt the movement of the disk 112 in the direction of the arrow 238.

It will, therefore, be appreciated that the positioning of rotating control rollers 170, 172 adjacent the opening 124 in the diskdrive 110 serve to slow the lateral movement of the disk 112 as it is being ejected from the diskdrive 110 in a well-known manner. This distance that the disk 112 will be ejected from the diskdrive 110 can be controlled based upon the radius of the first roller member 170 and the degree of rotation that the roller member 170 will be allowed to have. The roller members 170 and 172 are preferably spaced so that the frictional engagement between the first roller member 170 and the second roller member 172 with the lateral edges 182 and 184 of the disk is sufficient to halt the outward movement of the ejected disk. However, the frictional engagement should be such that a user could grasp the exposed portion 114 of the disk 112 and fully extract the disk from the diskdrive 110.

Using an ejection control mechanism such as the mechanism described above means that stronger springs can be used in the ejection mechanism to eject the disk while reducing the problems associated with the ejection mechanism ejecting the disk so strongly that the disks are completely dislodged from the diskdrive and fall onto the floor. Being able to use stronger springs also reduces the problems associated with the ejection mechanism springs fatiguing over time and not being sufficiently strong so as to be able to properly eject the disk. Moreover, since at least one of the control rollers is spring biased to rotate in a direction which further urges the disk 112 out of the drive 110, fatiguing of the ejection springs can be at least partially accommodated by the force provided by the rotating control member to ensure the disk is adequately ejected from the diskdrive.

Hence, although the foregoing description of the invention has shown, described and pointed the fundamental novel features of the invention, it will be understood that various omissions, substitutions, and changes in the form of the detail of the apparatus as illustrated, as well as the uses thereof, may be made by those skilled in the art without departing from the spirit of the present invention. Consequently, the scope of the present invention should not be limited to the foregoing discussions, but should be defined by the appended claims.

What is claimed is:

1. A computer drive assembly for receiving portable disks containing computer data, the assembly comprising:
   a housing defining a cavity which is sized so as to receive a portable disk through an opening in the housing such that when the disk is positioned in a first position in the cavity, data stored in the disk can be accessed;
   an ejection mechanism that engages with the disk, when the disk is in the first position, and urges the disk along a first path toward the opening, wherein the ejection mechanism includes a spring loaded ejection arm that is mounted within the housing so as to be movable such that the spring loaded ejection arm provides an impulse to the disk to urge the disk along the first path; and
   at least one roller member positioned along the first path so as to contact the disk as the disk is being urged along the first path by the impulse of the spring loaded ejection arm, wherein the at least one roller member engages with the disk in opposition to the motion of the disk provided by the impulse so as to retain the disk in the housing so that only a portion of the disk extends out of the opening in the housing, wherein the at least one roller member is adapted to permit a user to remove the disk from the housing by grasping the portion of the disk that extends out of the opening and pulling the disk from the housing, wherein the at least one roller member is movable between a first rotatable position and a second rotatable position in response to the disk traveling between the opening and the position within the cavity;
   a biasing mechanism that biases the at least one roller member in the first rotatable position and a capture mechanism that captures the at least one roller member in the second rotatable position after insertion of the disk into the cavity has urged the at least one roller member into the second rotatable position.

2. The assembly of claim 1, wherein the capture mechanism is engaged with a release member so that when the release member is actuated to release the disk from the at least one position, the first roller member is released from the second rotatable position.

3. The assembly of claim 2, wherein upon actuation of the release member, the disk is urged in a first direction toward the opening so that a first lateral edge of the disk engages with the at least one roller member.

4. The assembly of claim 2, wherein the release member is comprised of a plunger that has a protrusion formed thereon, wherein the protrusion engages with the at least one roller member so as to urge a portion of the first roller member in a at least one direction and wherein the pin is located on the at least one roller member at a first position such that the urging of the portion of the at least one roller member in the first direction disengages the pin from the aperture formed in the housing.

5. The assembly of claim 4, wherein the at least one roller member includes a compressible inner member mounted on a shaft and a rigid outer member and wherein the pin is positioned on the rigid outer member so that engagement of the protrusion with the rigid outer member results in the rigid outer member moving laterally with respect to the inner compressible member.

6. The assembly of claim 5, wherein the biasing mechanism is comprised of a spring that is engaged with the shaft so as to induce the at least one roller member to rotate.

7. The assembly of claim 1, wherein the capture mechanism is comprised of a pin that engages with an aperture formed in the housing.

8. The assembly of claim 7, wherein the at least one roller member is adapted to rotate between the first and second rotatable positions so that the disk travels only a at least one lateral distance upon contacting first roller member, such that only the portion of the disk extends out of the opening and the remaining portion of the disk is retained in the cavity.

9. A diskdrive assembly comprising:
   a chassis defining a receptacle having an opening at a first end, the receptacle adapted to receive a disk;
   an ejection mechanism having a user member wherein the ejection mechanism provides an impulse to the disk so as to propel the disk in a first direction so as to eject the disk from the receptacle out of the opening at the first end in response to the user manipulating the user member;

an ejection control mechanism that engages with the disk after the user has manipulated the user member so as to stop the travel of the disk in the first direction as a result of the impulse provided by the ejection mechanism so as to partially retain the disk in the receptacle with a portion of the disk extending out of the receptacle, wherein the ejection control mechanism is adapted to allow the user to fully extract the partially ejected disk from the opening of the receptacle;

wherein the ejection control mechanism comprises at least one roller member mounted adjacent the opening wherein the disk engages with the at least one roller member upon ejection from the receptacle, wherein the at least one roller member is adapted to rotate about a shaft upon user manipulation of the user member a pre-selected rotational distance in a first rotational direction so that the rotational movement of the at least one roller member urges the portion of the disk out of the opening in the diskdrive.

10. The assembly of claim 9, wherein the at least one roller member stops rotating after rotating the pre-selected rotational distance and the frictional engagement between the at least one roller member and the disk prevents the disk from being fully ejected from the receptacle.

11. The assembly of claim 10, wherein the ejection control mechanism includes a spring which biases the at least one roller member to rotate in the first direction.

12. The assembly of claim 11, wherein the ejection control mechanism includes a catch mechanism which retains the at least one roller member in a first rotational orientation in opposition to the biasing spring until the user has manipulated the user member.

13. The assembly of claim 12, wherein the catch mechanism includes a retaining pin formed in the at least one roller member and a retaining aperture formed in the diskdrive, wherein the pin and the retaining aperture are formed so that positioning of the pin in the retaining aperture retains the at least one roller member in the first rotational orientation in opposition to the bias of the spring.

14. The assembly of claim 13, wherein the ejection control mechanism further includes a release mechanism for releasing the pin from the retaining aperture in response to the user manipulating the user member so as to allow the at least roller member to rotate in the first direction.

15. The assembly of claim 14, wherein the release mechanism is comprised of a protrusion formed on the user member that urges the at least one roller member in a first lateral direction so as to dislodge the pin from the retaining aperture.

16. The assembly of claim 15, wherein the at least one roller member includes a flexible inner radial member and a rigid outer radial member that are each positioned about the shaft wherein the pin is formed in the rigid outer radial member and wherein the protrusion on the user member engages with the rigid outer radial member of the at least one roller member so as to compress the flexible inner radial member so as to laterally move the rigid outer member away from a centered position about the shaft to thereby dislodge the pin from the retaining aperture.

17. An ejection control mechanism for a computer diskdrive that prevents the computer disk from being fully ejected from the diskdrive upon user actuation of an ejection mechanism of the diskdrive, the ejection control mechanism comprising at least one roller member mounted about a shaft at a position adjacent an opening to the diskdrive wherein the ejection control mechanism includes a spring which biases the at least one roller to rotate in a first direction wherein the roller member is adapted to rotate a fixed rotational distance upon ejection of the disk and wherein the disk and the at least one roller member frictionally engage with each other during ejection of the disk so that the rotational movement of the at least one roller member urges the disk partially out of the diskdrive into a partially ejected position and wherein the frictional engagement between the disk and the roller member after the roller member has rotated the fixed rotational distance opposes the motion of the disk imparted by the ejection mechanism so as to halt the motion of the disk so that the disk is retained in the diskdrive in the partially ejected position.

18. The mechanism of claim 17, wherein the frictional engagement between the at least one roller member and the disk is such that a user can fully remove the disk from the diskdrive by grasping the disk and pulling the disk free of the diskdrive.

19. The mechanism of claim 17, further comprising a catch mechanism which retains the at least one roller member in a first rotational orientation to the biasing spring until the user has ejected the disk from the diskdrive.

20. The mechanism of claim 19, wherein the catch mechanism includes a retaining pin formed in the at least one roller member and a retaining aperture formed in the diskdrive wherein the pin and the retaining aperture are formed so that positioning of the pin in the retaining aperture retains the at least one roller member in the first rotational orientation in opposition to the bias of the spring.

21. The mechanism of claim 20, further comprising a release mechanism for releasing the pin from the retaining aperture in response to a user manipulating a user member so as to allow the at least one roller member to rotate in the first direction.

22. The mechanism of claim 21, wherein the release mechanism is comprised of a protrusion formed on the user member that urges the at least one roller member in a first lateral direction so as to dislodge the pin from the retaining aperture.

23. The mechanism of claim 22, wherein the at least one roller member includes a flexible inner radial member and a rigid outer radial member that are each positioned about a shaft wherein the pin is formed in the rigid outer radial member and wherein the protrusion on the user member engages with the rigid outer radial member of the at least one roller member so as to compress the flexible inner radial member so as to laterally move the rigid outer member away from a centered position about the shaft to thereby dislodge the pin from the retaining aperture.

24. A method of ejecting a disk from a diskdrive, the method comprising:

depressing a plunger to initiate an ejection mechanism; and imparting a force against the disk, in response to depressing the plunger so that the disk travels in a first direction towards an opening wherein a surface of the disk rollably engages with at least one roller that inhibits the travel of the disk in the first direction so as to permit the disk to travel out of the opening a first distance so as to be partially ejected from the diskdrive;

inducing the at least one roller to rotate in a first direction a first rotational distance while the disk is traveling in the first direction so that the at least one roller urges the disk in the first direction.

25. The method of claim 24, further comprising halting the rotation of the at least one roller after the roller has rotated the first rotational distance so that the frictional engagement between the disk and the at least one roller after the at least one roller has halted rotating prevents the disk from being ejected more than the first distance from the opening.

26. The method of claim 25, further comprising grasping the disk and pulling the disk free of frictional engagement with the at least one roller.

27. The method of claim 24, wherein inducing the at least one roller to rotate in a first direction comprises:

biasing the at least one roller to rotate in the first rotational direction;

capturing the at least one roller in a first rotational position in a captured state so that the at least one roller cannot rotate in the first rotational direction while captured; and releasing the at least one roller from the captured state, in response to depressing the plunger to initiate the ejection mechanism, so as to allow the at least one roller to rotate in the first rotational direction.

28. The method of claim 27, wherein the step of releasing the at least one roller from the captured state comprises exerting a force against the at least one roller so that a resilient inner portion of the at least one roller is compressed against a shaft about which the at least one roller rotates to thereby induce a rigid outer portion of the at least one roller member to move laterally outward with respect to the shaft wherein the lateral outward movement of the rigid outer portion of the at least one roller disengages a pin attached to the rigid outer portion of the at least one roller from a retaining opening in the diskdrive to thereby release the at least one roller from the captured state.

* * * * *

UNITED STATES PATENT AND TRADEMARK OFFICE
CERTIFICATE OF CORRECTION

PATENT NO. : 6,262,864 B1
DATED : July 17, 2001
INVENTOR(S) : Craig L. Boe

It is certified that error appears in the above-identified patent and that said Letters Patent is hereby corrected as shown below:

Column 2,
Line 25, please delete "form" and add -- from --.

Column 8,
Line 23, please delete "from the at least one" and add -- from the first --.
Line 24, please delete "the first roller" and add -- the at least one roller --.
Line 33, please delete "the first roller member in a at least one direction" and add -- the at least one roller member in a first direction --.
Line 54, please delete "only a at least one lateral" and add -- only a first lateral --.

Column 10,
Line 20, please delete "orientation to the" and add -- orientation in opposition to the --.

Signed and Sealed this

Twenty-sixth Day of April, 2005

JON W. DUDAS
*Director of the United States Patent and Trademark Office*